United States Patent [19]

Hirota et al.

[11] 4,113,673

[45] Sep. 12, 1978

[54] COATING COMPOSITION FOR LEAK DETECTION IN AIR TEST

[75] Inventors: Nobuyoshi Hirota; Akio Shibata, both of Nagasaki, Japan

[73] Assignee: Mitsubishi Jukogyo Kabushiki Kaisha, Tokyo, Japan

[21] Appl. No.: 775,328

[22] Filed: Mar. 7, 1977

[30] Foreign Application Priority Data

Mar. 18, 1976 [JP] Japan ................................. 51/28637
Apr. 19, 1976 [JP] Japan ................................. 51/43590

[51] Int. Cl.$^2$ ............................................. C08L 89/00
[52] U.S. Cl. ........................................ 260/8; 106/130; 106/135; 106/213; 260/17.4 ST; 260/29.6 H
[58] Field of Search ............... 260/8, 17.4 ST, 29.6 H; 106/33, 130, 213, 135; 252/72

[56] References Cited

U.S. PATENT DOCUMENTS 3,808,161  4/1974  Lipscomb, Jr. ............... 260/17.4 ST
3,893,965  7/1975  Moore et al. ................... 260/29.6 H

*Primary Examiner*—Lorenzo B. Hayes
*Attorney, Agent, or Firm*—Holman & Stern

[57] ABSTRACT

A coating composition for leak detection in an air test, consists of an aqueous solution containing from 1.6 to 9.6 wt% of soluble starch, from 0.04 to 0.75 wt% of water-soluble acrylic resin, from 0.05 to 0.5 wt% of gelatin, and from 0.5 to 1.0 wt% of a foaming agent, and is adjusted to a pH range between 4 and 10. The composition may be adjusted to a pH range between 4 and 6. It may also be an aqueous solution containing a coagulation modifier, with the pH adjusted to a range between 8 and 10 with the addition of a small amount of caustic alkali.

7 Claims, No Drawings

COATING COMPOSITION FOR LEAK DETECTION IN AIR TEST

This invention relates to a coating composition for leak detection in the air test that consists of filling compressed air into the hull of a ship, tank, pressure vessel, piping or other watertight or airtight structure to be tested and then giving a coat of a foamable composition onto the surface so that a foam produced thereon can be an indication of leakage from the inside.

Coating compositions for leak detection (hereinafter called "detecting compositions") thus far employed for the above purpose have contained dextrin (ab. 5 wt%) and gelatin (ab. 3 wt%) as their essential ingredients. They will dry up, when allowed to stand after the air test, leaving solid foams and films behind as incrustations over the tested areas. Recently it has been found that, when the entire surface including the tested areas is subsequently coated with an anti-corrosive paint, the portions of the coat overlying those residual incrustations will not stick fast but will prematurely come off. To prevent this, it is necessary to brush and wash off those unremoved incrustations completely prior to the painting. The numbers of man-hours required for such work are tremendous for large structures, such as ships. Moreover, the detecting compositions for general use (for mild climates) will prove less useful in winter because of inadequate gelatinization of the foams they produce.

It is the first object of this invention to provide a detecting composition improved over the prior art compositions in the removability of the resulting incrustations and which is capable of reducing the number of man-hours to be required for the removal and eliminating the possibility of the subsequently coated film coming off prematurely.

Thus, the present invention is directed to the provision of a detecting composition such that its unremoved incrustations on the surface can be simply washed away with water.

The second object of the invention is to provide a detecting composition which is an improvement over the conventional compositions having the above-mentioned disadvantages of forming incrustations difficult to remove and of exhibiting inferior detecting action in winter, and which reduces the number of man-hours to be required for the removal, eliminates the possibility of the subsequently coated film coming off the tested surface, and readily produces solid foams as desired on the test surface in the cold season.

These and other objects, features, and advantages of the invention will be better understood from the following detailed description.

As a result of our investigations about the detecting composition that would realize the foregoing objects, we have now found that the objects can be perfectly attained by (1) adding small amounts of water-soluble acrylic resin and gelatin to soluble starch as the chief ingredient, thereby forming a mixture as a foamable base composition,
(2) adding a small amount of a surface active agent as a foaming agent to the mixture, and
(3) dissolving the whole mixture in water, and finally adjusting the pH of the solution to a range between 4 and 10.

Specifically, the detecting composition of the invention consists of an aqueous solution containing from 1.6 to 9.6 wt% of soluble starch, from 0.04 to 0.75 wt% of water-soluble acrylic resin, from 0.05 to 0.5 wt% of gelatin, and from 0.5 to 1.0 wt% of a foaming agent, and adjusted to a pH range between 4 and 6.

With this composition the first object of the invention is fulfilled.

In our further search of a detecting composition that would achieve the second object of the invention, we have now found out the composition, which can be prepared by (1) adding small amounts of water-soluble acrylic resin and gelatin to soluble starch as the chief ingredient, thereby forming a mixture as a foamable base composition,
(2) adding a small amount of a surface active agent as a foaming agent to the mixture,
(3) further adding a coagulation modifier, and
(4) dissolving the whole mixture in water, and finally adjusting the pH of the solution with an alkali to a range between 8 and 10.

Importantly, it has now been found that a synergetic effect, which results from the addition of the coagulation modifier and the pH adjustment with an alkali, permits rapid solidification of foams made, even at low temperatures between 5° and 10° C.

The present invention is predicated upon the discoveries above described, and the detecting composition of the invention specifically consists of an aqueous solution containing from 1.6 to 9.6 wt% of soluble starch, from 0.04 to 0.75 wt% of water-soluble acrylic resin, from 0.05 to 0.5 wt% of gelatin, from 0.5 to 1.0 wt% of a foaming agent, and from 0.001 to 0.01 wt% of a coagulation modifier, and adjusted to a pH range between 8 and 10.

The detecting composition according to the invention is prepared by first adding soluble starch and gelatin to water and heating the mixture to 50° to 60° C. with agitation until the both are completely dissolved in the latter, adding and thoroughly dissolving a water-soluble acrylic resin solution in the aqueous solution, and further adding and dissolving a foaming agent, a coagulation modifier when necessary, and a pH adjusting agent in the solution, and thereafter allowing the resulting solution to cool down to the ordinary temperature.

As compared with conventional detecting compositions, that of the invention has a smaller gelatin content of from 0.05 to 0.5 wt%, which makes the gelatin easily soluble in water, and dextrin in the existing compositions is replaced by from 1.6 to 9.6 wt% of soluble starch and from 0.04 to 0.75 wt% of water-soluble acrylic resin, so that the unremoved incrustation of the coat of the detecting composition can be removed by washing with water for a short period of time. Furthermore, the soluble starch and water-soluble acrylic resin to be used in accordance with the invention act to make up for the loss of viscosity due to the use of less gelatin than heretofore and maintain the viscosity of the liquid detecting composition on a proper level, thus enabling the composition to form a dense and stable foam upon leak detection.

The detecting composition of the invention comprises the ingredients in amounts within the ranges specified above, for the reasons now to be explained.

(1) The base composition consisting of soluble starch, as the principal ingredient, and water-soluble acrylic resin and gelation, as adjuvants, amounts to from 1.8 to 10.9 wt% of the total weight of the detecting composition. Of the base percentage, from 1.6 to 9.6 wt% is accounted for by soluble starch, from 0.15 to 3.0 wt% by acrylic resin (in the form of a 25% solution), and from 0.05 to 0.5 wt% by gelatin. If the amounts of the individual ingredients of the base composition are below the respective ranges, the resulting composition will not give stable solid foams on defective areas where leaks have been detected. Conversely if the amounts exceed those ranges, the resulting liquid composition will be too viscous to form good foams and attain a satisfactory detection efficiency. Here an important feature is that, as already noted, the gelatin is considerably decreased in amount from the usual proportions in ordinary detecting compositions, to only from 0.05 to 0.5 wt% so as to be readily soluble in water, and from 1.6 to 9.6 wt% of soluble starch and from 0.04 to 0.75 wt% of water-soluble acrylic resin are incorporated in place of dextrin, so that any residual incrustation of the detecting composition left unremoved will be washed away with water in a short period of time. In addition, the soluble starch and water-soluble acrylic resin to be employed in accordance with the invention prevent a decrease in viscosity of the detecting composition due to the use of less gelatin than in conventional compositions and maintains a proper viscosity so that the liquid composition can form dense and stable foams during leak detection.

(2) The foaming agent is used in an amount from 0.5 to 1.0 wt%, because an amount below this range will provide inadequate foaming and poor detection accuracy while an excessive amount is not warranted economically, although it is not objectionable for the foaming purpose.

(3) The coagulation modifier is added in an amount between 0.001 and 0.01 wt%. If the amount is less than the lower limit, insufficient coagulation of the base composition will result. Excessive use, on the other hand, is uneconomical although it has no adverse effect on the coagulation.

(4) The pH adjusting agent is added so that the pH of the final composition is adjusted to a range between 4 and 10, or specifically between 4 and 6 or, when the composition is applied in winter, between 8 and 10. If the pH is outside the range from 8 to 10, for example, the resulting foam will not solidify in cold environments (at between 5° and 10° C., for example), and the difficulty in forming solid foams will reduce the leak detection efficiency.

Next, the substances to constitute the ingredients of the detecting composition according to the invention will be described in detail.

(1) Soluble starch: Prepared by immersing starch in from 7 to 8 wt% of hydrochloric acid, allowing it to stand at ordinary temperature for seven days, washing off the acid, and then drying the resultant at ordinary temperature. A commercially available product, for example, "Soluble Starch Grade 1" (trademark) sold by Ishizu Pharmaceuticals Co. may be used. The proportion of the soluble starch in the detecting composition is between 1.6 and 9.6 wt%.

(2) Water-soluble acrylic resin: An aqueous solution of 25 wt% of a polyacrylic acid with a molecular weight of approximately 500,000. As a product of commerce "Aron A-10(H)" (trademark) sold by Toa Gosei Chemical Industry Co. may be employed. The amount of the water-soluble acrylic resin in the detecting composition is between 0.04 and 0.75 wt% (in terms of solid acrylic resin; or between 0.15 and 3.0 wt% in terms of a 25 wt% aqueous solution).

(3) Gelatin; A refined gelatin commercially available for food or medicinal use. The amount of gelatin in the end composition is between 0.05 and 0.5 wt%.

The total amount of the soluble starch, water-soluble acrylic resin, and gelatin combined (the three ingredients forming a base composition) should account for from 1.8 to 10.9 wt% of the total weight of the detecting composition. If any of the ingredients of the base composition is smaller in amount than the range specified above for that particular ingredient, no stable solid foam will be produced at the leaking, defective point of the surface. Conversely if any of the ingredient is excessive, the resulting composition will become so viscous that it will not foam adequately at the defective point and will exhibit a low detection accuracy.

(4) Foaming agent: A nonionic or cationic surface active agent which is foamable. For example, either of the following may be used:
  Nonionic: Polyoxyethylene alkylphenolether, such as "Liponox NCI" (trademark) sold by Lion Fat & Oil Co.
  Cationic: Sodium dodecylbenzene sulfonate, such as "Liponox LE 110" (trademark) sold by Lion Fat & Oil Co.

The amount of the foaming agent is between 0.5 and 1.0 wt% of the total weight of the detecting composition. If the amount is less than this, poor foamability results in a low detection accuracy, and if the amount exceeds the range, an economical disadvantage will result while there is no unfavorable effect upon the foamability.

(5) Coagulation modifier: A commercially available chemical, such as "Thiourea Grade 1" of Ishizu Pharmaceuticals Co.

(6) pH adjusting agent:
(i) For adjustment to pH 4–6
For example, phosphoric acid for chemical or industrial applications. The amount of the pH adjusting agent to be incorporated in the detecting composition is such that it adjusts the pH of the composition to the range between 4 and 6. By doing so it is possible to maintain the gelatin in the composition within its isoelectric-point range and cause rapid gelatinization so as to form the initial base on which the foam produced on a leaking defective surface can solidify. The soluble starch and acrylic resin dry up on, while providing reinforcements to, the base and form a stable solid foam. If the pH of the detecting composition is outside the range of 4 to 6, the liquid foam produced on the defective surface will scarcely solidify and make the leak detection inaccurate. The use of phosphoric acid as the pH adjusting agent in the composition of the invention offers a secondary advantage when the composition is applied to a ferrous surface, in that the acid combines with the metal surface around the defective area to form a phosphate which, in turn, provides protection against rusting.

(ii) For adjustment to pH 8–10
For example, a 1 wt% aqueous solution of sodium hydroxide or potassium hydroxide of the first grade for chemical use. The concentration of this alkali solution may be thicker or thinner than one percent by weight, provided that the absolute amount of the alkali is adjusted to be equivalent to that in the 1 wt% solution.

EXAMPLE 1

Welded surfaces of cargo tanks of a ship were inspected for leaking defects by filling a tank with compressed air at different pressures of 0.1, 0.25, and 0.3 kg/cm² and the detecting compositions of the invention prepared in accordance with the recipes given in Table I and a conventional detecting composition were sprayed on the walls of an adjacent tank, each over a weld zone 30 meters long, and the leaking defects were detected. The results are summarized in Table II.

Table I

| Ingredient | Substance | Compositions Recipe (g) | | | | | |
|---|---|---|---|---|---|---|---|
| | | a | b | c | d | e | f |
| Base composition: | | | | | | | |
| Principal ingredient | Soluble starch | 16 | 24 | 48 | 72 | 96 | 96 |
| Adjuvants | 25% aq. soln. of acrylic resin | 1.5 | 2.5 | 5 | 30 | 10 | 5 |
| | Gelatin | 0.5 | 0.7 | 1.5 | 5 | 3 | 3 |
| Foaming agent | | 5 | 7 | 10 | 10 | 10 | 10 |
| pH adjusting agent | 10% phosphoric acid | 4 | 4 | 5 | 5 | 5 | 6 |
| Solvent | pure water | 973 | 961.8 | 930.5 | 878 | 876 | 880 |
| pH of the composition | | 4.0 | 4.0 | 5.0 | 5.5 | 5.5 | 6 |

Table II

| Air pressure (kg/cm²) | Numbers of defective points detected Composition | | | | | | |
|---|---|---|---|---|---|---|---|
| | a | b | c | d | e | f | Conventional |
| 0.1 | 9 | 9 | 9 | 9 | 9 | 9 | 9 |
| 0.25 | 11 | 11 | 11 | 11 | 11 | 11 | 11 |
| 0.3 | 11 | 11 | 11 | 11 | 11 | 11 | 11 |

As can be seen from Table II, there was no difference between the numbers of leaks detected but the composition a produced solid foams easy to collapse while the compositions c to f gave solid foams as stable as those formed by the conventional composition. The composition b formed very dense foams and gelatinized in an unusually short period of time, i.e., in one hour at 20° C. or in half an hour at 30° C., as compared with the compositions c to f and the reference composition. Since it gelatinized so fast and made solid foams on the defective points, the composition b proved most practical from the viewpoints of detection efficiency and material cost.

The compositions of the invention and of the prior art were tested for the removability by washing of the coats they formed. Tap water at a pressure of 2 kg/cm² was forced to run over the coated films for 10 seconds and the unremoved incrustations were weighed. The results are given in Table III.

Table III

| | Removability by washing of solid incrustations of detecting compositions | | | | | | |
|---|---|---|---|---|---|---|---|
| Composition | a | b | c | d | e | f | Conventional |
| Unremoved incrustation, wt% | 0.2 | 0.2 | 0.5 | 0.5 | 1.0 | 1.0 | 30 |

Next, sandblasted surfaces of sheet steel pieces (70 mm × 150 mm 33 3 mm) were coated with a long-exposure type wash primer to a coat thickness of about 20 microns and dried for 7 days. The coating compositions of the invention and of the prior art of Table I were applied with brushes to a thickness of about 10 microns over the coated surfaces. The total weights of the coated films on each test piece was measured, and tap water at a pressure of 2 kg/cm² was forced to flow over the piece. After drying, the surface was further coated with a chlorinated-rubber antirusting paint and overcoating paints of epoxy and coalter-epoxy types. Each piece thus overcoated was dried at ordinary temperature for 7 days. Then, the adhesion of the coats was tested. Table IV shows the results.

Table IV

| | | Results of adhesion test of coated films | | | | | | |
|---|---|---|---|---|---|---|---|---|
| Paint | Film thickness (micron) | Composition | | | | | | |
| | | a | b | c | d | e | f | Conventional |
| Chlorinated rubber | 40 | 25/25 | 25/25 | 25/25 | 25/25 | 25/25 | 25/25 | 5/25 |
| Epoxy | 100 | 25/25 | 25/25 | 25/25 | 25/25 | 25/25 | 25/25 | 3/25 |
| Coaltar-epoxy | 100 | 25/25 | 25/25 | 25/25 | 25/25 | 25/25 | 25/25 | 3/25 |

Note: Meaning of the test values:—Each coated piece was cut with straight lines lengthwise and widthwise at intervals of 2 mm to form 25 squares by a sharpedged knife, each line to the depth of the base metal surface. Cellophone adhesive tape was affixed to cover the checkered test area and then suddenly peeled off. The number of squares in which the coats resisted the pull and remained unstripped was counted (and expressed as the numerator). Where the numerator and the denominator are equal, the coats remained completely unremoved; the smaller the numerator the more the coats were stripped away, indicating poorer adhesion. (Because of the cut pattern this is known as a checkered testing method.)

As is obvious from the test results, the composition of the invention is remarkably improved over the conventional ones in the removability by washing of the unremoved incrustations of the coats used for leak detection in air tests. It thus achieves detection performance well comparable to the prior art compositions, while not in the least impairing the adhesion of overcoating paints. With these features the present invention is of great advantage to the industry.

EXAMPLE 2

Compositions prepared in accordance with the invention were used in the inspection of weld zones of ballast tanks of an oil tanker for leaking defects. In respect of the accuracy of detection, they were by no means inferior to the conventional detecting compositions for winter use.

The testing procedure was as follows. Each ballast tank was filled with compressed air at different pressures of 0.1, 0.25, and 0.3 kg/cm² in the usual manner, and each of detecting compositions of the invention prepared in accordance with the recipes given in Table V were sprayed over a 20-meters-long weld zone in the opposite side of the tank wall, and then the coat was inspected for any indication of leakage. The temperature of the steel plates that formed the tank was 7° C. at the time of testing. In the same manner as above described, conventional compositions for mild and cold seasons were also applied to the same surfaces for comparison purposes. The results are shown in Table VI.

convenient time after the application of the coating composition, thus greatly contributing to the streamlining of the inspection process.

The greatest feature of the composition of the invention, that is, the removability by washing of the residual incrustations of solid foams, was experimentarily confirmed in the following way. The surfaces coated with the different detecting compositions were washed by running water at a pressure of 2 kg/cm² for 10 seconds, and the residues on the surfaces were weighed. The results as compiled in Table VII were obtained. The conventional compositions left residues large enough to be discerned with the naked eye, whereas the rest compositions of the invention left traces or almost invisible

Table V

| Ingredient | Substance | Compositions Recipe (g) | | | | | |
|---|---|---|---|---|---|---|---|
| | | A | B | C | D | E | F |
| Base composition: | | | | | | | |
| Principal ingredient | Soluble starch | 16 | 24 | 48 | 72 | 96 | 96 |
| Adjuvants | 25% aq. soln. of acrylic resin | 1.5 | 2.5 | 5 | 30 | 10 | 5 |
| | Gelatin | 0.5 | 0.7 | 1.5 | 5 | 3 | 3 |
| Foaming agent | | 5 | 7 | 10 | 10 | 10 | 10 |
| Coagulation | | 1 | 1.5 | 3 | 10 | 6 | 6 |
| pH adjusting agent | | 5 | 10 | 15 | 30 | 30 | 30 |
| Solvent | Pure water | 971 | 954.3 | 917.5 | 843 | 845 | 850 |
| pH of the composition | | 8 | 8.5 | 9.0 | 9.5 | 10.0 | 10.0 |

Table VI

| Air pressure (kg/cm²) | Numbers of defective points detected | | | | | | | |
|---|---|---|---|---|---|---|---|---|
| | Composition | | | | | | Conventional | |
| | A | B | C | D | E | F | For mild season | For winter |
| 0.1 | 6 | 6 | 6 | 6 | 6 | 6 | 4 | 6 |
| 0.25 | 10 | 10 | 10 | 10 | 10 | 10 | 8 | 10 |
| 0.3 | 10 | 10 | 10 | 10 | 10 | 10 | 9 | 10 |

The numerical values in Table VI represent the numbers of leaking defective points, such as minute pinholes, that resulted from incomplete penetration of electrodes and blowholes in weld beads. As is clear from the results, the test composition according to the invention were exactly equal in detecting accuracy to the conventional composition for the winter use. The prior art composition for the mild climates tended to show poor detection performance at low temperatures in winter. This is attributable to the increased viscosity of the liquid composition and the failure of the foams to gelatinize at low temperatures. This means that the compositions of the invention have better detection performance with the conventional one for mild climates. The compositions A, B, and C in Tables V and VI are satisfactory in foamability but their solidified foams easily collapse with the lapse of time. They are of use, therefore, where the surface is to be inspected for defects within one hour or two. The compositions D, E, and F produce foams at defective points, which foams are solidified and remain long unless they are washed off. They permit the visual inspection to be done at any residues, indicating a great improvement in the removability by washing.

Table VII

| | Removability by washing of solid incrustations of detecting compositions | | | | | | | |
|---|---|---|---|---|---|---|---|---|
| Detecting composition | A | B | C | D | E | F | Conventional | |
| | | | | | | | For mild season | For winter |
| Unremoved incrustation, wt% | 0.1 | 0.1 | 0.3 | 0.8 | 0.6 | 0.6 | 30 | 20 |

In order to ascertain the degree of adverse effect the unremoved incrustations of the compositions of the invention could have upon the adhesion of the overcoating paints, the following tests were conducted.

Shotblasted pieces of sheet steel (each measuring 70 mm 33 150 mm × 3 mm) were coated with a long-exposure type wash primer to a coat thickness of about 20 microns, and the coats were dried at ordinary temperature for 24 hours. The liquid compositions A to F of the invention were applied to the dried surfaces to a thickness of about 10 microns each, and dried at 5° to 7° C. for 7 days. Tap water at a pressure of 2 kg/cm² was forced to run over the coated surfaces for 10 to 15 seconds. The moisture was dried up, and chlorinated-rubber, pure-epoxy, and coaltar-epoxy paints were applied on the surfaces, and dried at 20° C. for 7 days. Thereafter, the adhesion of the coats was tested by the checkered testing method (as described in Example 1). For the comparison purposes, similar tests were carried out with the conventional compositions for mild climates and for winter. The results are compiled in Table VIII (with the numerical values expressed in percent).

Table VIII

Results of adhesion tests of coated films

| Paint | Film thickness (micron) | A | B | C | D | E | F | Conventional (unit : %) for mild climates | For winter |
|---|---|---|---|---|---|---|---|---|---|
| Chlorinated-rubber antirusting paint | 40 | 100 | 100 | 100 | 100 | 100 | 100 | 20 | 25 |
| Pure-epoxy anticorrosive paint | 100 | 100 | 100 | 100 | 100 | 100 | 100 | 12 | 15 |
| Coaltar-epoxy anticorrosive paint | 100 | 100 | 100 | 100 | 100 | 100 | 100 | 12 | 15 |

As will be understood from the table, it was demonstrated that the compositions of the invention were improved over the prior art compositions in that the residues their coats leave behind have no possibility of impairing the adhesion of overcoats. This is attributable, as already noted, to the remarkable improvement in the removability by washing of the coat residues made possible by the present invention.

What is claimed is:

1. A coating composition for leak detection in an air test, comprising an aqueous solution containing from 1.6 to 9.6 percent by weight soluble starch, from 0.04 to 0.75 percent by weight water-soluble acrylic resin, from 0.05 to 0.5 percent by weight gelatin, and from 0.5 to 1.0 percent by weight a foaming agent, and said solution having a pH range between 4 and 10.

2. A composition according to claim 1, wherein said pH of said aqueous solution is in a range between 4 and 6.

3. A composition according to claim 1, which further contains from 0.001 to 0.01 percent by weight thiourea, and a small amount of an alkaline agent sufficient to maintain a pH range between 8 and 10.

4. A composition according to claim 1, wherein the total amount of said soluble starch, water-soluble acrylic resin, and gelatin is between 1.8 and 10.9 percent by weight of the solution.

5. A composition according to claim 1, wherein said foaming agent is a nonionic or cationic surface active agent which is foamable.

6. A composition according to claim 2, further comprising phosphoric acid in an amount sufficient to maintain said pH range.

7. A composition according to claim 3, wherein said alkaline agent is an aqueous solution of sodium hydroxide or potassium hydroxide.

* * * * *